Oct. 15, 1968   C. M. HANSEN ET AL   3,405,528
METHOD OF FORMING A SUBTERRANEAN MOISTURE BARRIER
Filed Aug. 25, 1966

INVENTORS.
Clarence M. Hansen
Thomas L. Speer
BY
Edwin C. Lehner
ATTORNEY

United States Patent Office 3,405,528
Patented Oct. 15, 1968

3,405,528
METHOD OF FORMING A SUBTERRANEAN MOISTURE BARRIER
Clarence M. Hansen, East Lansing, Mich., and Thomas L. Speer, Homewood, Ill.; said Hansen assignor to Board of Trustees, a constitutional corporation operating Michigan State University of Agriculture and Applied Science, and said Speer assignor to Standard Oil Company, Chicago, Ill., a corporation of Indiana
Filed Aug. 25, 1966, Ser. No. 575,098
4 Claims. (Cl. 61—1)

ABSTRACT OF THE DISCLOSURE

A continuous subterranean asphalt moisture barrier is provided by the separate formation in situ at a preselected depth beneath the soil surface of a plurality of barriers.

---

This invention relates to the control of water migration in soils. More particularly, it relates to a method of forming a subterranean moisture barrier in situ in preselected subsurface strata of soil coextensive with a desired area of soil surface to establish an artifical water table and control the downward percolation of water in porous soils; and also to control the upward migration of water in soils.

Large areas of land are located in arid and semi-arid areas of the world where, due to the porosity of the soil, insufficient water is retained in the plant root zone to make such land suitable for agricultural or grazing purposes. As the population of the world continues to grow, need for using this marginal land for agricultural purposes becomes more pressing. Formerly it was believed that this type of marginal land could not compete with the more fertile land and thus such marginal property was unsuitable for agricultural purposes. In many areas, good agricultural land is becoming sufficiently scarce so as to create a need for economical and easily applied methods for reclaiming sandy and other porous soils which lack sufficient water retention properties for agricultural purposes.

The upward migration of subsurface moisture is an ever present problem in many soils. For example, such moisture is extremely damaging to roads in temperate zones where alternate freezing and thawing produces frost boils and subsequent road destruction. This problem is especially acuate in plastic or clayey soils where adequate drainage cannot be effected.

Inasmuch as it is desirable to provide an artificial underground water barrier underlying a considerable surface area, it is extremely difficult to complete a finished barrier at once. The present invention provides a method for forming a substantially water impervious underground asphalt barrier of any desired extent by the formation of a plurality of parallel adjacent but non-contiguous asphalt troughs at a preselected soil stratum and then interconnecting adjacent edges of the troughs by forming a second set of asphalt troughs at a higher elevation but in contact with the edges of the first formed troughs whereby a barrier of interconnected asphalt troughs at alternate elevations is formed.

Figure 1:
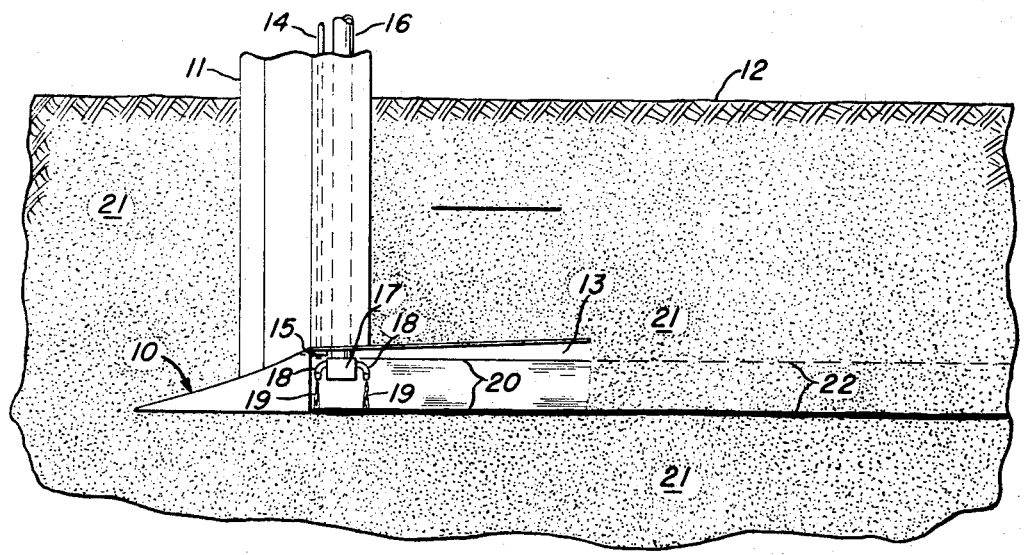
Figure 2:
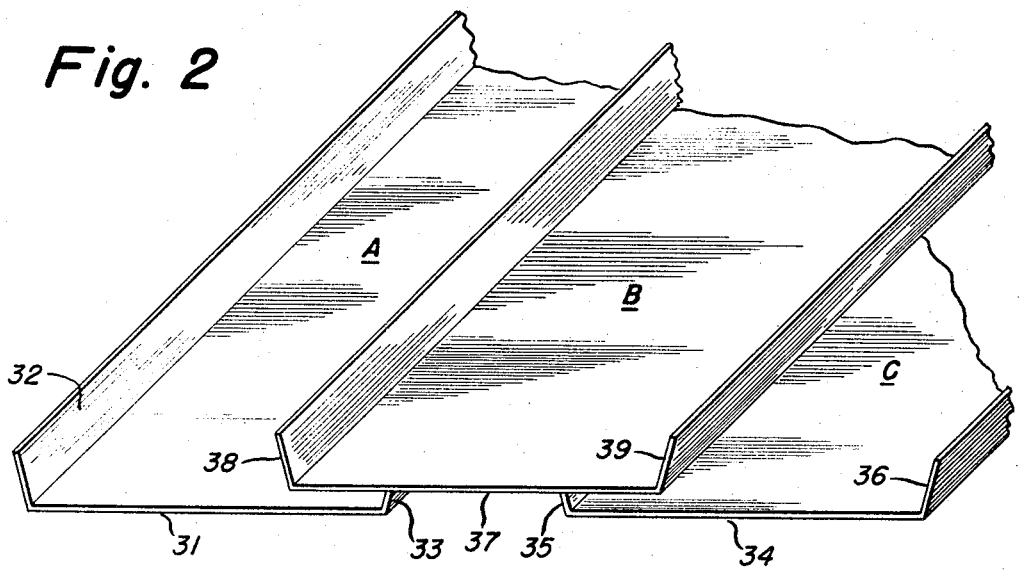

The present invention will be illustrated by the attached drawing wherein FIG. 1 is a side elevational view showing how individual subsurface asphalt troughs are formed in soils; and FIG. 2 schematically depicts the interconnection of a pair of troughs so as to form a water barrier of any desired size.

Referring to FIG. 1, the in situ formation of an underground asphalt trough is produced by means of a subterranean plow. Wedge-shaped subterranean plow 10, attached to shank 11 which, in turn, is attached to a tractor, not shown, is pulled in the direction of the arrow at a preselected depth below the soil surface 12. As the subterranean plow 10 is moved forward, the translating cavity 13 is formed with the side and bottom soil surfaces thereof unsupported and exposed. Gaseous anhydrous ammonia is introduced into cavity 13 via line 14 and distributing means 15 to produce a gaseous ammonia atmosphere in cavity 13. Thereafter, the cationic asphalt emulsion is introduced via line 16 and distributor 17 through spray nozzles 18 as spray 19 in a direction transversely to the direction of translation of the cavity 13. It is desirable that distributor 17 be provided with a plurality of spray nozzles 18 across the width of the cavity. Preferably, spray 19 has a flat fan-shaped pattern. The asphalt emulsion spray 19 is immediately broken on contact with the anhydrous ammonia in cavity 13 to form the continuous asphalt film 20 on the soil surfaces of the side walls and bottom of cavity 13. As plow 10 moves forward through the soil, the cavity is closed by the soil 21 thereby forming the completed underground asphalt trough 22.

It is essential to the formation of the continuous asphalt film 20, that the anhydrous ammonia atmosphere in the cavity 13 be completely gaseous otherwise any liquid ammonia that might be present would be trapped in the asphalt film and when it vaporized would leave a hole in the film. It has also been found that the asphalt spray 19 must be directed at an angle within ±15° of perpendicular to the side and bottom soil surfaces of the cavity otherwise hydraulic mixing of the asphalt and soil occurs. Mixing of soil and asphalt prior to coalescence and setting of the asphalt must be avoided. Satisfactory barriers are only obtained when a continuous film of asphalt is produced on the side and bottom soil surfaces of the cavity. Mixing of the asphalt with soil or penetration (migration) of the asphalt into the soil prior to closing of the cavity results in a mere mixture of soil and asphalt that does not have any barrier effect to stop water migration.

For agricultural purposes, the barrier should be deep enough to permit cultivation of the root zone without disturbing barrier 22. However, barrier 22 should not be so deep that the roots of the plants will not be nourished by the water trapped by such barrier. The depth of the barrier below the surface will vary with the type of plant being grown in the root zone. Usually from 20 to 36 inches will be found satisfactory.

In accordance with this invention, subterranean asphalt water barriers were installed in a one-acre to three-acre test plots in Grayling sand in northwestern Michigan. An aqueous cationic asphalt emulsion containing of about 65 weight percent asphalt having a penetration of about 150–200 at 77° F., about 0.2 weight percent N-tallow-1,3-propylene diamine and about 0.1 weight percent concentrated hydrochloric acid to form the amine hydrochloride as emulsifying agent, about 0.1 weight percent calcium chloride as emulsion stabilizer, and the balance, water, was prepared. This emulsion was applied at rates of about 1000 to 2500 gallons per acre, at tractor speeds of about one to two miles per hour, at a nozzle pressure of 14–16 p.s.i., and at depths of 22 and 24 inches on 24-inch centers with a plow having a width of 34 inches, length of 32 inches, and a height of 5″ with about 12 inches of cavity from the spray nozzles to the trailing edge of the plow. Spray orifices were about 4 inches from the bottom surface of the cavity. The length of each continuous asphalt trough was about 200 feet. The ammonia flow to the cavity was about 17–24 pounds per acre. A continuous asphalt membrane was formed across the width of the plots by first forming parallel but non-contiguous troughs at a depth of about 24 inches on 48-inch centers then the plow level was raised so that the bottom of the plow was at 22 inches and passed between the previously laid troughs, again on 48-inch centers so that the plow intersected the adjacent side walls of the pairs of the individual troughs formed at the 24 inch depth. The asphalt layer formed in the bottom of the upper pass connected with the cut and exposed upstanding edge of the lower troughs in the exposed bottom of the upper cavity and effectively formed asphalt seal between the upper and lower troughs. Referring now to FIG. 2 to illustrate how joining of a pair of the asphalt troughs is obtained. Trough A having bottom portion 31 and side walls 32 and 33 is first formed as described hereinbefore at a preselected depth. Then adjacent Trough C having bottom 34 and side walls 35 and 36 is formed at the same depth in similar fashion. Thereafter Trough B having bottom wall 37 and side walls 38 and 39 is formed in same manner, but at a higher elevation, with bottom wall 37 intersecting walls 33 and 35 and effecting a seal between said bottom and said walls. Repetitive formation of the troughs at the respective levels produces a continuous underground water barrier in the desired areas. Exploratory holes dug in representative locations in the test and adjacent soil areas showed that continuous asphalt membranes having average thicknesses of about 3/32 to about 1/4 were formed and an artificial water table established throughout the test area.

Conventional aqueous cationic (acidic) asphalt emulsions are suitable for use in this invention. It has been found that the use of the "rapid set" type of emulsions, which are well known to the art, is essential to the formation of satisfactory subterranean asphalt water barriers in accordance with this invention. The "rapid set" emulsions are of the type that can quickly break and set to a continuous asphalt film upon application. The formation of these emulsions is well known to the art. Suitable emulsions for use at ambient temperatures consist essentially of 55–70 weight percent of an asphalt having a penetration of about 60–300, preferably 150–200, at 77° F., an amount of cationic emulsifying agent sufficient to form a "rapid set" emulsion, about 0.05 to 0.75 weight percent, and the balance, water. Suitable emulsifying agents for use in preparing these emulsions, include primary, secondary, tertiary, and polyamine salts. These salts are usually formed in the aqueous emulsifying solution by the reaction of the amine with an acid such as hydrochloric. These emulsions can be made so that they are stable for storage and transportation yet will rapidly break when applied in accordance with this invention. It is essential that the emulsion be broken and the continuous asphalt film be formed on the soil surfaces of the cavity prior to the closing of the cavity otherwise a discontinuous barrier is formed. At a lineal speed of the tractor at one to two miles per hour, the translating cavity of about one foot in length, between the asphalt distributor and the trailing edge of the plow, is formed for about 0.33 to about 0.7 second. The satisfactory performance of the asphalt barrier as a water barrier is only achieved when the asphalt emulsion is broken and the asphalt particles are able to coalesce and set as a continuous film prior to the closing of the cavity where the film is subjected to compressive and gravitational forces by the soil closing the cavity. The asphalt barrier formed in accordance with this invention is a non-self-supporting asphalt film yet it has the necessary strength to resist substantial penetration of soil particles when the cavity is closed. Essential to the in situ formation of a satisfactory underground asphalt barrier in the manner disclosed herein is the maintenance of a gaseous anhydrous ammonia atmosphere in the translating cavity and the angle of the asphalt emulsion spray introduced into the cavity with respect to the ground surfaces of the cavity. The ammonia should be maintained in excess of that amount sufficient to react with the emulsifier in the emulsion so as to effectively break the aqueous asphalt emulsion and set the asphalt as a continuous film during the time the cavity is open.

While a trough has been illustrated as having a flat bottom and outwardly extending upstanding walls, it will be apparent that other configurations, such as concave or hemispherical, may be used provided clean intersections can be formed between adjacent troughs where desirable.

Other applications will be readily apparent to those skilled in the art for utilizing the method of this invention to form monolithic subterranean asphalt water barriers in situ to control the upward and downward migration of water in soils. It is particularly suitable for forming effective subsurface water barriers in roads built over plastic subgrades having a constant moisture content and thereby prevent upward intrusion of water through capillarity into the road bed.

We claim:
1. The method of forming in situ a subterranean moisture barrier in preselected subsurface strata of soil coextensive with a desired soil surface area, which comprises:
   (a) forming a plurality of parallel and non-contiguous individual buried asphalt troughs having upstanding side wall and bottom wall portions in a first preselected subsurface stratum of soil; and
   (b) interconnecting adjacent upstanding walls of a pair of said first asphalt troughs by forming a plurality of parallel and non-contiguous individual buried asphalt troughs having upstanding side wall and bottom wall portions at a second preselected subsurface stratum at a higher elevation than said first plurality of troughs so that the bottom portion of said second troughs intersect and join said pair adjacent upstanding walls, said individual troughs being formed by the steps of:
      (i) forming a translating cavity in a preselected subsurface stratum of soil without significantly disrupting the structure of the soil surface, said cavity having unsupported and exposed side and bottom soil surfaces;
      (ii) establishing a gaseous anhydrous ammonia atmosphere in said cavity;
      (iii) introducing a spray of an aqueous cationic asphaltic emulsion into said cavity, said spray being directed transversely to the direction of translation and at an angle that is within $\pm 15°$ of perpendicular to said side and bottom soil surfaces, whereby said emulsion is quickly broken and a continuous film of asphalt is formed on said side and bottom soil surfaces of said cavity prior to closing said cavity; and
      (iv) thereafter closing said cavity
whereby a continuous asphaltic water barrier coextensive with the soil surface is formed in situ in said subsurface soil strata.

2. The method of claim 1 wherein said asphaltic emulsion contains about 50–70 weight percent asphalt having a penetration of about 60–300 at 77° F.

3. The method of claim 2 wherein said asphalt has a penetration of about 150–200 at 77° F.

4. The method of claim 1 wherein said spray forms a flat fan-shaped pattern.

References Cited

UNITED STATES PATENTS

| | | | |
|---|---|---|---|
| 668,362 | 2/1901 | Tomlinson | 61—13 |
| 1,006,116 | 10/1911 | Morse | 61—72.6 X |
| 1,398,815 | 11/1921 | Trusty et al. | 61—72.2 |
| 1,401,386 | 12/1921 | Woodberry | 61—13 |
| 3,121,973 | 2/1964 | Phillips et al. | 61—36 X |
| 3,276,208 | 10/1966 | Bolt | 61—1 |
| 3,349,568 | 10/1967 | Smith et al. | 61—72.2 |

EARL J. WITMER, *Primary Examiner.*